US012600881B2

(12) United States Patent
Shin et al.

(10) Patent No.: US 12,600,881 B2
(45) Date of Patent: Apr. 14, 2026

(54) COMPOSITION FOR FORMING HARD COATING LAYER, HARD COATING LAYER USING THE COMPOSITION, AND LAMINATE COMPRISING THE HARD COATING LAYER

(71) Applicant: Dongjin Semichem Co., Ltd., Incheon (KR)

(72) Inventors: Eun Soo Shin, Siheung (KR); Sung Il Kim, Siheung (KR); Hae So Jeon, Siheung (KR); Young Min Yoon, Siheung (KR); Ki Taek Lee, Siheung (KR); Byong Wook Lee, Siheung (KR)

(73) Assignee: Dongjin Semichem Co., Ltd., Incheon (KR)

( * ) Notice: Subject to any disclaimer, the term of this patent is extended or adjusted under 35 U.S.C. 154(b) by 919 days.

(21) Appl. No.: 17/238,790

(22) Filed: Apr. 23, 2021

(65) Prior Publication Data

US 2021/0238447 A1 Aug. 5, 2021

Related U.S. Application Data

(63) Continuation of application No. PCT/KR2019/013924, filed on Oct. 23, 2019.

(30) Foreign Application Priority Data

Oct. 23, 2018 (KR) ........................ 10-2018-0127005

(51) Int. Cl.
*C09D 183/04* (2006.01)
*C09D 7/63* (2018.01)
(Continued)

(52) U.S. Cl.
CPC ............. *C09D 183/04* (2013.01); *C09D 7/63* (2018.01); *C09D 163/00* (2013.01); *C08G 77/14* (2013.01); *C08K 3/32* (2013.01)

(58) Field of Classification Search
CPC ....... C09D 183/04; C09D 7/63; C09D 163/00
See application file for complete search history.

(56) References Cited

U.S. PATENT DOCUMENTS

| | | | | |
|---|---|---|---|---|
| 6,150,435 A * | 11/2000 | Bayer | C08G 59/18 522/170 |
| 6,545,064 B1 * | 4/2003 | Bilodeau | C09D 4/06 522/18 |

(Continued)

FOREIGN PATENT DOCUMENTS

| | | |
|---|---|---|
| JP | 2015-138150 A | 7/2015 |
| KR | 10-2009-0057597 A | 6/2009 |

(Continued)

OTHER PUBLICATIONS

Machine translation of KR-2009 0057597 (Year: 2009).*

*Primary Examiner* — Doris L Lee
(74) *Attorney, Agent, or Firm* — United One Law Group LLC; Kongsik Kim; Jhongwoo Peck

(57) ABSTRACT

Disclosed herein are a composition for forming a hard coating layer that is easy to mold, a hard coating layer including the composition, and a laminate including the hard coating layer. The composition may include a hard coating resin, a photoinitiator, a thermal initiator, and a solvent, where the weight ratio of the photoinitiator to the thermal initiator ranges from 1:50 to 10:1.

13 Claims, 2 Drawing Sheets

(51) Int. Cl.
*C09D 163/00* (2006.01)
*C08G 77/14* (2006.01)
*C08K 3/32* (2006.01)

(56) References Cited

U.S. PATENT DOCUMENTS

| | | | | |
|---|---|---|---|---|
| 9,381,733 | B1 * | 7/2016 | Li | G03F 7/038 |
| 2016/0297933 | A1 * | 10/2016 | Kuwana | B32B 7/12 |
| 2018/0237658 | A1 * | 8/2018 | Yoon | B05D 7/02 |
| 2020/0048462 | A1 * | 2/2020 | Ahn | C08G 77/14 |

FOREIGN PATENT DOCUMENTS

| | | | | | |
|---|---|---|---|---|---|
| KR | 20090057597 | A | * | 6/2009 | C09D 5/18 |
| KR | 10-2016-0053788 | A | | 5/2016 | |
| KR | 10-2016-0076040 | A | | 6/2016 | |
| KR | 10-2016-0092507 | A | | 8/2016 | |
| WO | WO-2017034357 | A1 | * | 3/2017 | B05D 7/02 |

* cited by examiner

COMPOSITION FOR FORMING HARD COATING LAYER, HARD COATING LAYER USING THE COMPOSITION, AND LAMINATE COMPRISING THE HARD COATING LAYER

CROSS-REFERENCE TO RELATED APPLICATIONS

This application is a continuation application of International Application No. PCT/KR2019/013924 filed on Oct. 23, 2019, which claims priority to Korean Application 10-2018-0127005 filed on Oct. 23, 2018. The aforementioned applications are incorporated herein by reference in their entireties.

TECHNICAL FIELD

The present invention relates to a composition for forming a hard coating layer, a hard coating layer comprising the composition, and a hard coating laminate comprising the hard coating layer, and more particularly, to a composition for forming a hard coating layer that has excellent surface hardness and strength and is easy to mold, a hard coating layer comprising the composition, and a hard coating laminate comprising the hard coating layer.

RELATED ART

With the expansion of electronic devices, such as smartphones and tablet PCs, various types of protection films for protecting LCD panels of mobile devices from external shocks and back covers for protecting the backside of the electronic devices are being developed.

In particular, windows having three-dimensional curved surfaces are used recently, in order to realize an excellent grip of electronic devices, protection of the products, and aesthetics of the exterior. Accordingly, efforts are being made to develop screen protection films with good adhesion on the curved surface of display panels. For example, products molded to have a three-dimensional (3D) shape that corresponds to the shape of the display panel are available on the market.

Generally, the protection film for display panels has a multi-layer laminate structure consisting of a clear film made of a polymer compound such as a thermoplastic resin, including polyethylene terephthalate (PET), polycarbonate (PC), or polyurethane (PU), an adhesive applied on one side of the clear film, and a protective sheet for providing protection for the adhesive-coated surface.

Korean Patent Publication NO. 10-1221441 discloses a protection film that has a laminating structure consisting of a surface protective layer, a main resin layer, and an adhesive layer.

SUMMARY

It is an object of the present invention to provide a composition for forming a hard coating layer that has excellent surface hardness and strength and is easy to mold, a hard coating layer comprising the composition, and a hard coating laminate comprising the hard coating layer.

However, the problem to be solved by the present invention is not limited to the above-described problem, and other problems that are not described will be clearly understood by those skilled in the art from the following disclosure.

In an aspect of the present invention, there is provided a composition for forming a hard coating layer. The composition includes a hard coating resin, a photoinitiator, a thermal initiator, and a solvent, where the composition has a weight ratio of the photoinitiator to the thermal initiator ranging from 1:50 to 10:1.

In another aspect of the present invention, there is provided a hard coating layer that includes a hard coating resin, a photoinitiator, and a thermal initiator, where the hard coating layer has a weight ratio of the photoinitiator to the thermal initiator ranging from 1:50 to 10:1.

The composition for forming a hard coating layer according to an embodiment of the present invention includes a thermal initiator and a photoinitiator, to allow a hard coating layer to be formed in a first step of performing a surface curing in the photo-curing process. Subsequently, a second step of performing thermo-compression bonding and molding processes can be carried out with ease while the surface-cured hard coating layer remains flexible.

The composition for forming a hard coating layer according to an embodiment of the present invention does not require the use of an additional material for imparting flexibility. In addition, a complete curing can be achieved without cracking of the hard coating layer during the thermo-compression bonding and molding processes that are performed after coating, and the composition can be molded into a three-dimensional shape.

In accordance with an embodiment of the present invention, only the surface curing is performed via the photo-curing process after application of the hard coating layer, and the thermo-compression bonding and molding processes are conducted while the hard coating layer remains flexible, so there is no cracking of the hard coating layer even after the formation of a three-dimensional shape.

In addition, since the thermo-compression bonding process is performed in a state where the hard coating layer is surface-cured, there is no problem that the hard coating layer is transferred to the mold or the like. This can reduce the possible occurrence of defects during the thermo-compression bonding process and also secure excellent adhesiveness and hardness.

DETAILED DESCRIPTION

Figure 1:
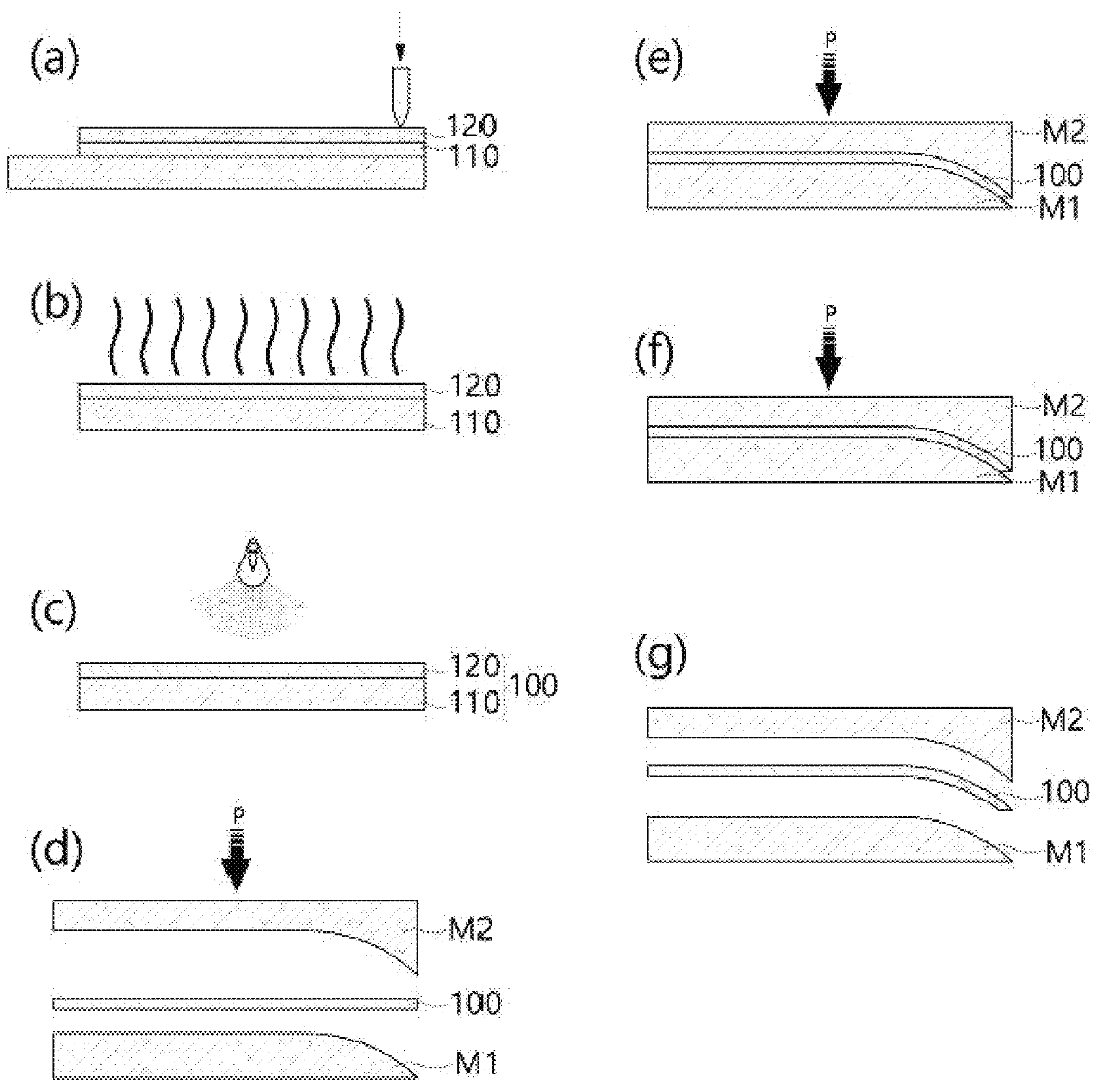
FIG. 1 is a cross-sectional view schematically showing the process of forming a laminate including a hard coating layer according to an embodiment of the present invention.

As the present invention allows for various changes and numerous embodiments, particular exemplary embodiments will be illustrated in the drawings and described in detail. However, the present invention is not limited to the specific embodiments and should be construed as including all changes, equivalents, and substitutions included in the spirit and scope of the present invention.

In the following description of the present invention, a detailed description of known techniques incorporated herein will be omitted when it may make the subject matter of the present invention rather unclear. In the description of this specification, ordinal numbers, such as “first” and “second”, are used only for distinguishing one component from another.

Throughout the specification, unless specified otherwise, the terms "includes" and/or "including", "comprises" and/or "comprising" will be understood to imply the inclusion of a stated component but not preclude the presence of one or more other components.

In an aspect of the present invention, there is provided a composition (herein also referred to as "hard coating composition") for forming a hard coating layer that is easy to mold. The hard coating composition according to an embodiment of the present invention may include a hard coating resin, a photoinitiator, a thermal initiator, and a solvent. In particular, the composition may have a weight ratio of the photoinitiator to the thermal initiator ranging from 1:50 to 10:1.

In accordance with an embodiment of the present invention, the hard coating resin may be a material capable of forming a hard coating layer by thermal curing and photoinitiation. The hard coating resin as used herein may include an organic resin or an organic-inorganic hybrid type resin, such as silsesquioxane, acrylate, methacrylate, epoxy, urethane, silicon, or melamine.

In accordance with an embodiment of the present invention, the hard coating layer may be contained in an amount of 5 to 70 wt. % with respect to the total weight of the hard coating composition. If the content of the hard coating resin is less than 5 wt. %, the coating solution may exhibit a low viscosity and may flow too easily. Thus, it may become difficult to use in the slit coating process, and the coating uniformity may be degraded when the coating thickness is 5 μm or above. If the content of the hard coating resin exceeds 70 wt. %, the viscosity of the coating solution may become too high to implement a uniform hard coating, and it may require a long preparation time.

In accordance with an embodiment of the present invention, when the hard coating resin contains silsesquioxane, the silsesquioxane may have a weight average molecular weight of 1,000 to 1,000,000. An example of the silsesquioxane as used herein may include, but is not limited to, the silsesquioxane disclosed in Korean Patent Publication No. 2015-0105603. When the hard coating resin contains epoxy, the epoxy may be 2-(3,4 epoxycyclohexyl) ethyltrimethoxysilane. When the hard coating resin contains (meth)acrylate, the methacrylate may be 1H,1H,2H,2H-heptadecafluorodecyl ester, 2-hydroxyethyl methacrylate, or 1,6 hexanediol acrylate.

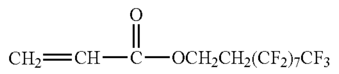

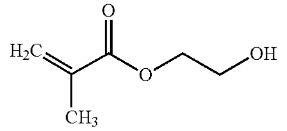

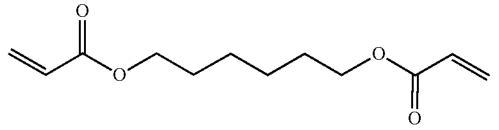

In accordance with an embodiment of the present invention, the weight ratio of the photoinitiator to the thermal initiator may range from 1:50 to 10:1. When the weight ratio is out of the above range because the photoinitiator lacks, it may lead to insufficient initial curing, which may require attaching a release sheet or cause a transfer of the hard coating layer during a molding process. With the weight ratio out of the above range due to the thermal initiator lacking, the thermal curing after the molding process may be insufficient, making it difficult to confer basic properties or resulting in poor adhesion to the substrate. The weight ratio of the photoinitiator to the thermal initiator may preferably range from 1:1 to 1:10, and more preferably from 1:2 to 1:5.

In accordance with an embodiment of the present invention, the photoinitiator as used herein may be a cationic photoinitiator or a radical polymerization photoinitiator. The examples of the cationic photoinitiator may include, but are not limited to, antimony-, boron-, sulfonium-, or phosphate-based photoinitiators, and the examples of the radical polymerization initiator may include, but are not limited to, hydroxy- or peroxy-based photoinitiators.

More specifically, examples of the cationic photoinitiator as used herein may include (4-methylphenyl) [4-(2-methylpropyl)phenyl]iodonium hexafluorophosphate, bis(4-dodecylphenyl)iodonium hexafluoroantimonate, bis(diphenyl sulfonium) dihexafluoroantimonate, (4-(1-methylethyl)phenyl)-(4-methylphenyl)iodonium tetrakis(pentafluorophenyl) borate, arylsulfonium hexafluorophosphate salt, modified sulfonium salt hexafluorophosphate, diphenyl(4-phenylthio) phenylsufonium hexafluorophosphate, (phenyl)[4-(2-methylpropyl) phenyl]iodonium hexafluorophosphate, triarylsulfonium hexafluorophosphate salts, tetrakis(3,5-difluoro-4-alkylphenyl) borate, tetrakis(2,3,5,6-tetrafluoro-4-alkyloxyphenyl) borate, perfluoroalkyl sulfonate, bis [(perfluoroalkyl)sulfonyl]imide, perfluoroalkyl phosphate, bis(perfluoroalkyl) tetrafluorophosphate, and the like.

Examples of the radical photoinitiator as used herein may include benzoinmethylether, benzoinisopropylether, benzyl ketal, benzyldimethyl ketal, 1-hydroxy-cyclohexyl phenyl ketone, (2,4,6-trimethyl benzoyl)-phenyl phosphine oxide, benzoyl peroxide, 2,2'-azo-bis-isobutylonitrile, and the like. In accordance with an embodiment of the present invention, the photoinitiator may be contained in an amount of 0.1 to 1 wt. % with respect to the total weight of the hard coating composition. If the content of the photoinitiator is less than 0.1 wt. %, the surface curing of the hard coating layer during the formation of the hard coating layer may be insufficient, causing a transfer of the hard coating layer to the mold in the 3D molding process. The transferred defects may accumulate on the mold over time, eventually changing the shape of the mold. In addition, even when the 3D molding is performed with a protection film applied, a cured hard coating layer may be pushed out between the hard coating layer and the protection film, causing similar defects. If the content of the photoinitiator exceeds 1 wt. %, over-curing of the hard coating layer may occur even with a low exposure, causing the hard coating layer to lose flexibility and cracks to occur during the 3D molding process, thereby making it difficult to mold the hard coating layer into a 3D shape. Further, the photoinitiator may act as a photo-curing agent, or a separate photo-curing agent may be included.

In accordance with an embodiment of the present invention, the thermal initiator may be a cationic thermal initiator or a radical polymerization thermal initiator. Examples of the cationic thermal initiator may include, but are not limited to, antimony-, boron-, and phosphorus-based thermal initiators. Examples of the radical polymerization thermal initiator may include, but are not limited to, peroxide- or azo-based thermal initiators. The thermal initiator may act as a thermal curing agent, or a separate thermal curing agent may be used.

More specifically, examples of the cationic thermal initiator as used herein may include 4-acetoxyphenylmethylbenzyl sulfonium • tetrakis(2,3,4,5,6-pentafluorophenyl) borate, 4-acetoxyphenylmethyl(2-methylbenzyl) sulfonium • tetrakis(pentafluorophenyl) borate, 4-acetoxyphenyl 3-methylphenylbenzylsulfonium • tetrakis(pentafluorophenyl) borate, San-Aid™ SI-80, San-Aid™ SI-80, San-Aid™ SI-80L, San-Aid™ SI-100, San-Aid™ SI-100L, San-Aid™ SI-110L, San-Aid™ SI-145, San-Aid™ SI-150, a chelate compound of a metal such as aluminum or titanium and acetoacetates or diketones, a silanol compound such as triphenylsilane, and the like.

Examples of the radical polymerization thermal initiator as used herein may include 2,2'-azobis(isobutylonitrile), 2,2'-azobis-2-methylisobutylonitrile, azobis-2-methyl-isobutylonitrile, 1,1'-azobis(cyclohexane-1-carbonitrile), 1-[(1-cyano-1-methylethyl)azo]formamide, 2,2'-azobis(4-methoxy-2,4-dimethylvaleronitrile), 2,2'-azobis(2,4-dimethylvaleronitrile), 2,2'-azobis(2-methylbutyronitrile), 4,4'-azobis(4-cyanovaleric acid), 2,2'-azobis[N-(2-propenyl)-2-methylpropionamide], 2,2'-azobis(N-butyl-2-methylpropionamide), 2,2'-azobis(N-cyclohexyl-2-methylpropionamide), 2,2'-azobis{2-methyl-N-[1,1-bis(hydroxymethyl)-2-hydroxyethyl]propionamide, 2,2'-azobis[2-methyl-N-(2-hydroxyethyl)]propionamide, ketoneperoxide, diacylperoxide, hydroxyperoxide, dialkylperoxide, peroxyketal, alkylperester, Percarbonate, and the like. Among these, from the viewpoint of high catalytic activity, examples of the peroxide-based thermal initiator may include di-tert-butylperoxide or di-tert-amylperoxide. The above-mentioned azo-based thermal initiator may include 2,2'-azobis(2-methyl-propane).

In accordance with an embodiment of the present invention, the thermal initiator that is activated at or above the drying temperature adopted in the formation of the hard coating layer may be used. Although not limited thereto, when the drying process is performed at 80° C. or below, for example, a thermal initiator that has an activation temperature of 80° C. or above, specifically 85° C. or above, may be used.

This is because if the solvent is dried by adopting the drying temperature of about 80° C. in the formation of the hard coating layer, a polymerization reaction may occur during the drying process by the activation of the thermal initiator at the lower temperature. Therefore, in order to allow thermal curing to occur in the thermo-compression bonding process, not in the drying process, a thermal initiator that is activated at or above the drying temperature during the formation of the hard coating layer may be used.

In accordance with an embodiment of the present invention, the thermal initiator may be contained in an amount of 0.1 to 5 wt. % with respect to the total weight of the hard coating composition. If the content of the thermal initiator is less than 0.1 wt. %, the thermal polymerization in the 3D formation process may be insufficient to secure good adhesion to the substrate, making the hard coating layer susceptible of peeling off. If the content of the thermal initiator exceeds 5 wt. %, polymerization may occur too rapidly in the 3D formation process, causing cracks in the hard coating layer, which may make it more difficult to form a 3D shape.

In accordance with an embodiment of the present invention, the photoinitiator and the thermal initiator may be selected appropriately based on the type of the hard coating resin.

When the hard coating resin includes at least one of silsesquioxane and epoxy, the photoinitiator may include at least one of antimony- and boron-based photoinitiators, and the thermal initiator may include at least one of antimony- and phosphorus-based thermal initiators. In this case, the hard coating resin may have a molecular weight in the range from 1,500 to 4,500.

In addition, when the hard coating resin includes at least one of acrylate and methacrylate, the photoinitiator may include at least one of triazine-, acetophenone-, imidazole-, benzoin-, benzophenone-, and anthracene-based photoinitiators, and the thermal initiator may include at least one of peroxide- and azo-based thermal initiators. In this case, the hard coating resin may have a molecular weight ranging from 1,500 to 25,000.

The solvent may be selected typically from isopropoxy ethanol (IPE), propylene glycol methyl ether acetate (PGMEA), propylene glycol methyl ether (PGME), diethylene glycol methyl ethyl ether (MEDG), or methylethylketone (MEK), which may be added to regulate viscosity and coatability.

In accordance with an embodiment of the present invention, the hard coating composition may further include an additive, such as a leveling agent and a slip agent. However, the additives are not limited thereto, and the additive may be contained in an amount of 0.005 to 3 wt. % with respect to the total weight of the hard coating composition. When the content of the additive is less than 0.005 wt. %, the desired properties of the additive may not appear; and when the content of the additive exceeds 3 wt. %, the additive functions like a resin having other properties, resulting in poor coatability or deteriorated surface properties.

In another aspect of the present invention, there is provided a hard coating layer formed from the hard coating composition, and also a laminate (e.g., a laminate structure) comprising a base substrate and the hard coating layer.

The hard coating layer according to an embodiment of the present invention may be formed from the above-described hard coating composition, and the weight ratio of the photoinitiator to the thermal initiator included in the hard coating layer may range from 1:50 to 10:1. More specifically, with respect to the total weight of the hard coating composition, the hard coating resin may be contained in an amount of 5 to 70 wt. %, and the photoinitiator and the thermal initiator may be contained in an amount of 0.1 to 1 wt. % and 0.1 to 5 wt. %, respectively. The types and properties of the individual components are as described above.

Figure 2:
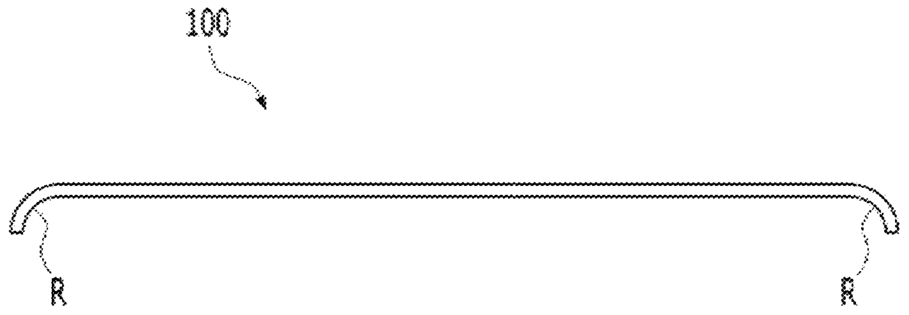
FIG. 2 is a cross-sectional view schematically showing the cross-section of the laminate according to an embodiment of the present invention.

As shown in FIG. 1, a laminate 100 according to an embodiment of the present invention may include a base substrate 110 and a hard coating layer 120 formed on the top of the base substrate 110. The laminate may be formed, as shown in FIG. 2, with the substrate having a three-dimensional shape that includes a curved surface with a curved edge portion R formed in a downward direction. Further, in accordance with an embodiment of the present invention, there may be a variety of the three-dimensional shape, including a shape having an edge forming a defined angle without a curved surface, as well as a shape with a curved surface.

Although not shown in the drawings, the base substrate 110 may include first and second substrate layers, which may be advantageous for the three-dimensional molding process and for achieving a hardness of 4H or higher. More specifically, although the compositions of the individual layers are not limited, the first substrate layer may include a material having a flexural modulus value of 450,000 or greater, preferably 450,000 or greater and 500,000 or less, while having a thickness of 40 to 100 μm. The second substrate layer may include a general polycarbonate-based material in order to maintain good moldability. The second substrate layer may include a material having a flexural modulus value of 450,000 or less, preferably 400,000 or less and 200,000 or greater.

In still another aspect of the present invention, there is provided a method for preparing the laminate 100 that includes the hard coating layer 120 formed of the hard coating composition according to an embodiment of the present invention.

The method for preparing the laminate 100 according to an embodiment of the present invention may include preparing the base substrate 110, forming the hard coating layer 120 using the hard coating composition on the base substrate 110, a first curing process of surface-curing the hard coating layer 120 by irradiation, and a second curing process of applying heat and pressure to the firstly cured hard coating layer 120.

Hereinafter, a detailed description will be given as to the method for preparing a laminate according to an embodiment of the present invention.

The structures and properties of the hard coating layer and the laminate comprising the same according to an embodiment of the present invention can be more clearly specified and understood by this description.

FIG. 1 is a cross-sectional view schematically showing the preparation method for the laminate according to an embodiment of the present invention, and FIG. 2 is a cross-sectional view schematically showing the cross-section of the laminate according to an embodiment of the present invention. Hereinafter, a description will be made by focusing on the preparation method for the laminate, but it may also be understood by a preparation method for a hard coating layer having a three-dimensional shape according to an embodiment of the present invention.

Firstly, as shown in FIG. 1(*a*), a base substrate 110 may be provided, and a hard coating layer 120 may be formed using a hard coating composition on the base substrate 110.

In accordance with an embodiment of the present invention, the base substrate 110 may include polycarbonate (PC), polyimide (PI), polyethylene (PE), polypropylene (PP), polyarylate (PAR), polyethylenterephthalate (PET), or poly (methylmethacrylate) (PMMA), but it is not limited thereto.

The components of the hard coating composition may be as described above.

In accordance with an embodiment of the present invention, the thickness of the hard coating layer 120 may be 5 to 60 μm, preferably 5 to 45 μm. When the hard coating layer is less than 5 μm thick, a thin film coating may be difficult to acquire and hardness characteristics may be poor. When the thickness of the hard coating layer exceeds 60 μm, cracking of the hard coating layer may occur during the photo-curing or molding process.

Secondly, as shown in FIG. 1(*c*), a photo-curing process may be performed.

The photo-curing process may be conducted by exposing the hard coating layer to a radiation, which may include UV, infrared light, or the like. Although not limited thereto, for example, the amount of the radiation may range from 0.5 J to 2 J. In accordance with an embodiment of the present invention, the hard coating composition may include a photoinitiator, to allow it to undergo surface curing through the photo-curing process.

In accordance with an embodiment of the present invention, a drying process may be performed prior to the photo-curing process (as shown in FIG. 1(*b*)). Although not limited thereto, for example, the drying process may be performed at 50 to 100° C. for 5 to 20 minutes.

In accordance with an embodiment of the present invention, a thermal initiator as included in the composition may perform initiation at or above the drying temperature of the drying process, to prevent the polymerization reaction from occurring in the drying process, and to allow a thermal curing to occur in the thermo-compression bonding process that is performed thereafter.

Thirdly, the hard coating layer may be cut to a predetermined size, and then thermo-compression bonding and molding processes may be carried out.

In accordance with an embodiment of the present invention, the thermo-compression bonding and molding processes may be performed concurrently, for example, using the press thermo-compression bonding technique (e.g., thermal lamination).

More specifically, the press thermo-compression bonding process may be performed using molds M1 and M2 having curved surfaces in order to achieve a molding as shown in FIGS. 1(*d*), 1(*e*), and 1(*f*).

As shown in FIG. 1(*d*), the laminate 100 including the surface-cured base substrate 110 and the hard coating layer 120 may be mounted on a preheated lower mold M1 and then subjected to preheating. Although not limited thereto, preheating may be performed at 100 to 180° C. for 10 to 120 seconds.

As shown in FIGS. 1(*e*) and 1(*f*), the laminate 100 may be pressed with an upper mold M2 after the preheating. Although not limited thereto, the load applied to the upper mold M2 may be 5 to 15 tons, and compression may be performed for 5 to 60 seconds. In other words, a three-dimensional molding process with a curved surface and a complete curing process can be carried out concurrently.

In accordance with an embodiment of the present invention, the temperature of the molds may be maintained higher than the initiation temperature of the thermal initiator. When compression is performed at a temperature lower than the initiation temperature of the thermal initiator, the three-dimensional molding may become more difficult, and the polymerization may not be achieved easily.

The thermo-compression bonding process may be followed by a cooling process, which may yield the fully cured laminate 100. As shown in FIG. 2, the laminate 100 may have an edge portion with a three-dimensional curved surface R that is bent in a downward direction.

An additional process such as anti-fingerprint coating may be performed on the laminate 100, which can then be used as a protection film for curved display panels, a curved display window, a back cover or accessary for mobile phones, and a three-dimensional plastic product or cover for mobile phones or electronic devices.

The hard coating composition according to an embodiment of the present invention may contain a thermal initiator and a photoinitiator, to allow a first step of surface curing to be performed in the photo-curing process to form a hard coating layer. Subsequently, the surface-cured hard coating layer can undergo a second step of the thermo-compression bonding and molding processes successfully while the hard coating layer retains flexibility.

Generally, the hard coating layer would develop cracks when formed into a thick coating having a thickness of 5 μm or greater, to acquire hard coating properties, and then compressed into a curved shape.

In accordance with an embodiment of the present invention, however, no crack develops in the hard coating layer even if the hard coating layer is molded into a thick coating, because only the surface curing is performed through the photo-curing process, and the hard coating layer remains flexible in the subsequent thermo-compression bonding and curve-molding processes. Besides, the thermo-compression bonding process may be performed in a state where the hard coating layer is surface-cured, so there is no issue for the hard coating layer transferring to the molds, which may reduce the defect rate of the thermo-compression bonding process. Further, the hard coating layer may exhibit excellent adhesion and hardness. Without being limited thereto, for example, the hardness may range from 4H to 9H.

Generally, in order to improve the surface properties of the hard coating layer, it is necessary to use a material having additional functionality, such as nano silica, and to form a thick coating. For molding the hard coating layer into a three-dimensional shape, it is also needed to separately form the hard coating layer and then laminate heterogeneously or to use a flexible resin to add flexibility.

However, according to an embodiment of the present invention, there is no need to use a separate material for imparting flexibility or improving surface properties, and even if formed into a thick coating, the hard coating layer can be completely cured without cracks and molded into a three-dimensional shape in the thermo-compression bonding and molding processes.

Hereinafter, the present invention will be described in further detail by way of examples according to an embodiment of the present invention, which examples are not construed to limit the scope of the present invention.

EXAMPLES

Preparation of Composition for Hard Coating Layer (1) Preparation of Hard Coating Resin For the control of the basicity, 25 wt. % of an aqueous solution of tetramethylammonium hydroxide (TMAH) and 10 wt. % of an aqueous solution of potassium hydroxide (KOH) were mixed to prepare a catalyst.

5 parts by weight of distilled water, 15 parts by weight of tetrahydrofuran, and 1 part by weight of the catalyst prepared above were added dropwise to a dried flask equipped with a cooling tube and an agitator. The mixture was agitated at room temperature for one hour. Subsequently, 20 parts by weight of 2-(3,4-epoxycyclohexyl)ethyltrimethoxysilane and then 15 parts by weight of tetrahydrofuran were added dropwise to the mixture, which was then agitated for 5 more hours. The mixture solution under agitation was pipetted, washed twice to eliminate the catalyst and impurities, filtered, and then analyzed by IR spectroscopy. The analytical results identified a Si—OH functional group (3200 $cm^{-1}$) present in the terminal group and confirmed that silsesquioxane of a linear structure had a molecular weight of 8,000 in terms of a styrene equivalent molecular weight.

(2) The silsesquioxane obtained above, a cationic photoinitiator 2-methyl-4'-(methylthio)-2-morpholiopropiophenone (Igarcure 907, Basf), a cationic thermal initiator benzyl (4-hydroxyphenyl)methylsulfonium hexafluoroantimonate (B5428, TCI), a hard coating leveling agent or slip agent, and a Si additive (BYK-333) were added to a 2-isopropoxyethanol (Aldrich) solvent, to obtain a composition for forming a hard coating layer. The contents of the individual ingredients were varied as shown in the following Tables 1 and 2 to prepare compositions of Examples 1 to 12 and Comparative Examples 1 to 10.

TABLE 1

Unit: wt. %

| | Hard coating resin | Photoinitiator | Thermal initiator | Additive |
|---|---|---|---|---|
| Example 1 | 60 | 0.1 | 0.1 | 0.05 |
| Example 2 | 60 | 0.1 | 1 | 0.05 |
| Example 3 | 60 | 0.1 | 3 | 0.05 |
| Example 4 | 60 | 0.1 | 5 | 0.05 |
| Example 5 | 60 | 0.5 | 0.1 | 0.05 |
| Example 6 | 60 | 0.5 | 1 | 0.05 |
| Example 7 | 60 | 0.5 | 3 | 0.05 |
| Example 8 | 60 | 0.5 | 5 | 0.05 |
| Example 9 | 60 | 1 | 0.1 | 0.05 |
| Example 10 | 60 | 1 | 1 | 0.05 |
| Example 11 | 60 | 1 | 3 | 0.05 |
| Example 12 | 60 | 1 | 5 | 0.05 |

TABLE 2

Unit: wt. %

| | Hard coating resin | Photoinitiator | Thermal initiator | Additive |
|---|---|---|---|---|
| Comparative Example 1 | 60 | — | 3 | 0.05 |
| Comparative Example 2 | 60 | 0.09 | 3 | 0.05 |
| Comparative Example 3 | 60 | 1.1 | 3 | 0.05 |
| Comparative Example 4 | 60 | 0.5 | — | 0.05 |
| Comparative Example 5 | 60 | 0.5 | 0.09 | 0.05 |
| Comparative Example 6 | 60 | 0.5 | 6 | 0.05 |
| Comparative Example 7 | 60 | 0.1 | 5.1 | 0.05 |
| Comparative Example 8 | 60 | 0.1 | 7 | 0.05 |
| Comparative Example 9 | 60 | 1.1 | 0.1 | 0.05 |
| Comparative Example 10 | 60 | 3 | 0.1 | 0.05 |

Molding Process

The hard coating layer was applied with a thickness of 30 μm on the top surface of a plastic substrate that was washed with water and alcohol. After drying in an oven at 85° C. for 10 minutes, UV exposure (1 J) was performed to obtain a surface-cured hard coating layer sample. The surface-cured hard coating layer sample was cut into a size for 3D molding. The sample thus obtained was mounted on the lower plate of a mold that was preheated at 150° C. to preheat the hard coating layer for about 10 to 30 seconds. The mold was designed to have an edge with a curved surface with a radius of 15 mm, as shown in FIG. 1. With a load of 10 tons, the mold was thermo-compressed for 10 to 20 seconds and then cooled down to the room temperature under the ambient pressure to obtain a final hard coating layer.

Evaluation

The hard coating layers obtained in Examples 1 to 12 and Comparative Examples 1 to 6 were evaluated in regards to the cracking of the molding process, the formation of a three-dimensional shape, the transfer of the hard coating layer, adhesion, and hardness. The evaluation results are presented in the following Tables 3 and 4.

The cracking of the molding process, the formation of a three-dimensional shape, and the transfer of the hard coating layer to the mold were denoted by O (yes) or X (no).

(1) Adhesion

The adhesion between the substrate and the hard coating layer was measured after the molding process. Under the room temperature and damp-proof conditions, the hard coating layer that completed the molding process was cut in a 10×10 grid pattern consisting of 1 mm×1 mm square cuts. A 3M tape (3M #610 cellophane film tape) was applied to the surface of the cross-cut hard coating layer, rubbed to firmly attach to the film, and then pulled away in a vertical direction. The hard coating layer peeled off from the substrate was visually inspected. With any one out of 100 square cuts detached, the hard coating layer was considered to have poor adhesion to the substrate.

(2) Hardness

A 500 g of load was applied to an electric pencil hardness tester (SS-PC2) to measure the pencil hardness. The pencils as used herein were Mitsubishi products. The testing was performed five times per pencil. The maximum pencil hardness that caused scratches once or less was considered as the pencil hardness of the hard coating film.

TABLE 3

| | Cracking | 3D molding | Shift of coating layer | Adhesion | Hardness (500 g) |
|---|---|---|---|---|---|
| Example 1 | X | ○ | X | ○ | 6H |
| Example 2 | X | ○ | X | ○ | 6H |
| Example 3 | X | ○ | X | ○ | 6H |
| Example 4 | X | ○ | X | ○ | 6H |
| Example 5 | X | ○ | X | ○ | 7H |
| Example 6 | X | ○ | X | ○ | 7H |
| Example 7 | X | ○ | X | ○ | 7H |
| Example 8 | X | ○ | X | ○ | 7H |
| Example 9 | X | ○ | X | ○ | 7H |
| Example 10 | X | ○ | X | ○ | 7H |
| Example 11 | X | ○ | X | ○ | 7H |
| Example 12 | X | ○ | X | ○ | 7H |

TABLE 4

| | Cracking | 3D molding | Shift of coating layer | Adhesion | Hardness (500 g) |
|---|---|---|---|---|---|
| Comparative Example 1 | X | X | ○ | X | — |
| Comparative Example 2 | X | X | ○ | X | — |
| Comparative Example 3 | ○ | ○ | X | ○ | 7H |
| Comparative Example 4 | X | ○ | X | X | — |
| Comparative Example 5 | X | ○ | X | X | — |
| Comparative Example 6 | ○ | X | X | ○ | 7H |
| Comparative Example 7 | ○ | X | X | ○ | 7H |
| Comparative Example 8 | ○ | X | X | ○ | 7H |
| Comparative Example 9 | ○ | ○ | X | ○ | 8H |
| Comparative Example 10 | ○ | ○ | X | ○ | 8H |

According to the evaluation results, the Examples in which the hard coating layers were formed as thick films had neither cracks nor the transfer of the hard coating layers in the second step of thermo-compression bonding and molding performed subsequent to the first step of surface curing through the photo-curing process. In addition, the edge with a curved surface was formed at the same time with the thermo-compression bonding process, and good adhesion and hardness of 6H to 7H were acquired.

Although the foregoing description of the present invention has been presented with reference to the examples of the present invention, it may be apparent to those skilled in the art that many modifications and variations can be made to the present invention without departing from the spirits and scope of the present invention disclosed in the following claims.

DESCRIPTION OF REFERENCE NUMERALS

100: Laminate (protection film)
110: Base substrate
120: Hard coating layer
M1: Lower mold
M2: Upper mold

What is claimed is:

1. A composition for forming a hard coating layer, comprising:
- a hard coating resin, wherein the hard coating resin comprises at least one resin selected from the group consisting of silsesquioxane, 1H,1H,2H,2H-heptadecafluorodecyl acrylate, and 2-hydroxyethyl methacrylate;
- a photoinitiator;
- a thermal initiator; and
- a solvent,
- wherein the photoinitiator is contained in an amount of 0.1 to 1 wt. % with respect to the total weight of the composition, and the thermal initiator is contained in an amount of 0.1 to 5 wt. % with respect to the total weight of the composition, and
- wherein the amount of the photoinitiator and the amount of the thermal initiator are selected to achieve three-dimensional moldability and satisfy a condition that a weight ratio of the photoinitiator to the thermal initiator is in a range from 1:2 to 1:10.

2. The composition according to claim 1, wherein the photoinitiator comprises at least one selected from the group consisting of antimony-, boron-, sulfide-, triazine-, acetophenone-, imidazole-, benzoin-, benzophenone-, and anthracene-based photoinitiators.

3. The composition according to claim 1, wherein thermal initiator comprises at least one selected from the group consisting of antimony-, boron-, phosphorus-, peroxide-, and azo-based thermal initiators.

4. The composition according to claim 1, wherein the hard coating resin is contained in an amount of 5 to 70 wt. % with respect to the total weight of the composition for forming a hard coating layer.

5. The composition according to claim 1, wherein the hard coating resin comprises the silsesquioxane,
- wherein the photoinitiator comprises an antimony-based photoinitiator, a boron-based photoinitiator, or both, and
- wherein the thermal initiator comprises an antimony-based thermal initiator, phosphorus-based thermal initiator, or both.

6. The composition according to claim 1,
- wherein the photoinitiator comprises at least one selected from triazine-, acetophenone-, imidazole-, benzoin-, benzophenone-, and anthracene-based photoinitiators, and
- wherein the thermal initiator comprises a peroxide-based thermal initiator, an azo-based thermal initiator, or both.

7. The composition according to claim 1, wherein the composition further comprises a leveling agent, a slip agent, or both.

8. A hard coating layer fabricated from the composition according to claim 1.

9. The hard coating layer according to claim 8, wherein the hard coating layer has a three-dimensional shape.

10. The hard coating layer according to claim 8, wherein the hard coating layer has a thickness of 5 to 60 μm.

11. A laminate comprising the hard coating layer according to claim 8.

12. A laminate comprising the hard coating layer according to claim 9.

13. A laminate comprising the hard coating layer according to claim 10.

* * * * *